United States Patent [19]
Browning

[11] Patent Number: 5,917,676
[45] Date of Patent: Jun. 29, 1999

[54] DISC DRIVE VIBRATION REDUCTION DEVICE

[75] Inventor: Theodore R. Browning, Bloomington, Minn.

[73] Assignee: Seagate Technology, Inc., Scotts Valley, Calif.

[21] Appl. No.: 08/920,370

[22] Filed: Aug. 29, 1997

Related U.S. Application Data

[60] Provisional application No. 60/045,187, Apr. 30, 1997.

[51] Int. Cl.$^6$ .................................................. G11B 5/012
[52] U.S. Cl. ........................................................ 360/97.01
[58] Field of Search ............................. 360/97.01, 97.02, 360/137; 369/75.1, 34, 36

[56] References Cited

U.S. PATENT DOCUMENTS

| | | | |
|---|---|---|---|
| 4,893,210 | 1/1990 | Mintzlaff | 360/97.01 X |
| 5,200,938 | 4/1993 | Akiyama et al. | 369/36 |
| 5,255,251 | 10/1993 | Fitzgerald et al. | 360/98.06 X |
| 5,255,254 | 10/1993 | Watanabe et al. | 369/75.1 |
| 5,317,554 | 5/1994 | Taylor et al. | 369/36 X |
| 5,377,175 | 12/1994 | Nehl | 369/75.1 |
| 5,768,249 | 6/1998 | Ro et al. | 360/97.02 X |

*Primary Examiner*—John H. Wolff
*Attorney, Agent, or Firm*—Westman, Champlin & Kelly

[57] ABSTRACT

A vibration control device for controlling vibration of a disc drive supported in a compartment of a mass storage array. Disc drives stored in a compartment of a mass storage array may move within the compartment during operation of the mass storage array. Movement of a disc drive in a compartment may affect the performance of the disc drive to retrieve data from and write data to selected data tracks of a disc. In particular, vibration along an extent of the disc drive aligned with an operational stroke of the actuator mechanism may skew the operational stroke of the disc heads supported via the actuator mechanism. The vibration control device includes a spring which is adapted to exert a biasing force to a disc drive inserted into a compartment to restrict movement of the disc drive within the compartment.

20 Claims, 4 Drawing Sheets

DISC DRIVE VIBRATION REDUCTION DEVICE

CROSS-REFERENCE TO RELATED APPLICATION

The present invention claims priority to Provisional Application Serial No. 60/045,187, filed Apr. 30, 1997, abn and entitled DISC DRIVE ROTATIONAL VIBRATION REDUCTION SPRING CLIP.

FIELD OF THE INVENTION

The present invention relates to a mass storage array system. In particular, the present invention relates to a vibration reduction device for a mass storage array system for storing disc drives for collective access by a host computer system.

BACKGROUND OF THE INVENTION

Disc drives are known to store digital information on rigid discs coated with a magnetizable material in a plurality of circular, concentric data tracks. Discs are mounted on a spindle motor which rotates the discs for operation. Disc heads are supported relative to disc surfaces and actuated relative to disc surfaces via an actuation mechanism. Control circuitry is coupled to the spindle motor and actuation mechanism for rotating discs and positioning disc heads for retrieving information from selected data tracks.

A mass storage array system may incorporate a plurality of individual disc drives which are supported in an array for selective access via a host computer system. The host computer system is electrically coupled to the control circuitry of individual disc drives via a connector port of the disc drive. Individual disc drives are supported by a cabinet structure to form the mass storage array. The cabinet structure includes a plurality of stacked racks. A plurality of compartments extend between adjacent racks. Typically, disc drives are enclosed in a carrier box, which is sized for insertion into compartments. The carrier box is designed to be releasably secured within compartments of the cabinet.

During operation of the storage array, vibration forces may be introduced to the disc drive enclosed within a carrier box. In particular, if the carrier box is loosely fitted within a compartment for ease of removal and insertion, the disc drive may vibrate, thus degrading the performance characteristics of the disc drive. If the disc drive and carrier vibrate or move, positioning of the disc heads relative to desired data tracks may be affected.

It is more difficult to insert and release individual disc drives and carrier boxes if the size of the compartment is too small in relation to the size of the disc drive and carrier box. Thus, it is desirable to provide a system which allows for the insertion and release of disc drives within a compartment of a mass storage array which also limits the vibrational motion of the disc drive within the compartment of the mass storage array. The present invention provides a solution to this and other problems, and it offers advantages over the prior art.

SUMMARY OF THE INVENTION

The present invention relates to a vibration control device for controlling vibration of a disc drive supported in a compartment of a mass storage array. In particular, vibration along an extent of the disc drive aligned with an operational stroke of an actuator mechanism may skew the operational stroke of the disc heads supported via the actuator mechanism. The vibration control device limits vibration corresponding to the operational stroke of the actuator mechanism.

Preferably, the vibration control device includes a spring which is adapted to exert a biasing force to a disc drive inserted into a compartment to restrict longitudinal movement of the disc drive within the compartment. Preferably, the device includes a clip member coupled to the spring for securing the spring relative to spaced racks. In particular, in the preferred embodiment, the clip member is designed to snap fit into recesses formed in the racks to support the spring for contact with a carrier box enclosing the disc drive to limit longitudinal movement of the carrier box within a gap defined between adjacent racks and the carrier box.

DETAILED DESCRIPTION OF THE PREFERRED EMBODIMENTS

Figure 1:
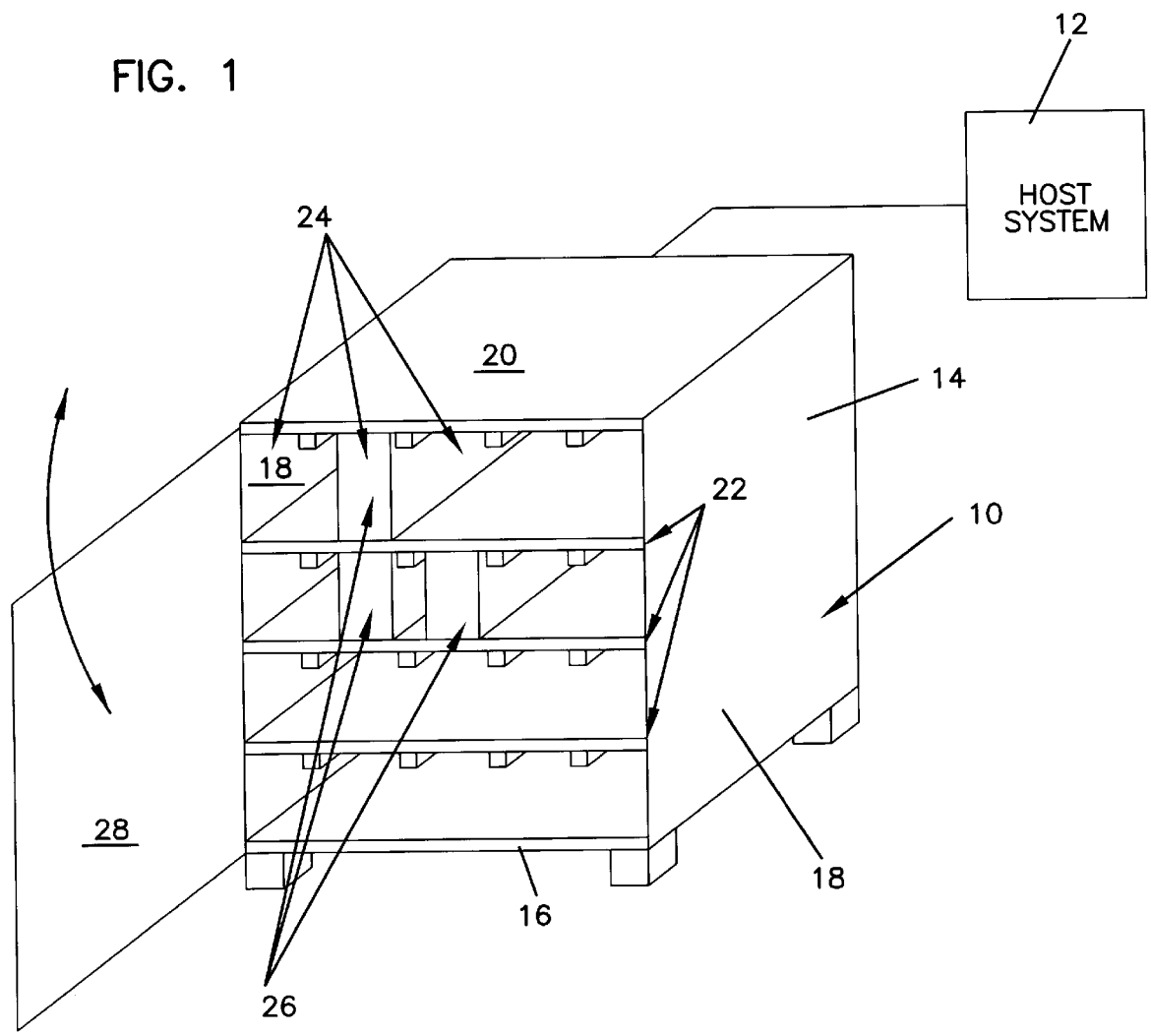
FIG. 1 is a perspective view of a mass storage array system.

FIG. 1 illustrates a mass storage array 10 coupled to a host computer system 12 for storing a plurality of disc drives (not shown in FIG. 1) for selected access by the host system 12. As shown, the mass storage array 10 includes a cabinet 14, having a base 16, opposed side walls 18, and top 20. A plurality of spaced racks 22 extend between opposed walls 18 and are supported thereby. A plurality of compartments 24 are defined between adjacent spaced racks 22 along the length of racks 22. Compartments 24 between adjacent racks 22 may be segregated by partitions or other means to define the boundaries for individual compartments. Individual disc drives are releasably supported in individual compartments for access by the host computer system. Preferably, disc drives are enclosed in a carrier box 26 (carrier boxes shown inserted into compartments 24 in FIG. 1). Preferably, a door 28 is hingedly connected to a wall 18 for providing access to the interior of the cabinet 14 and compartments 24.

Figure 2:
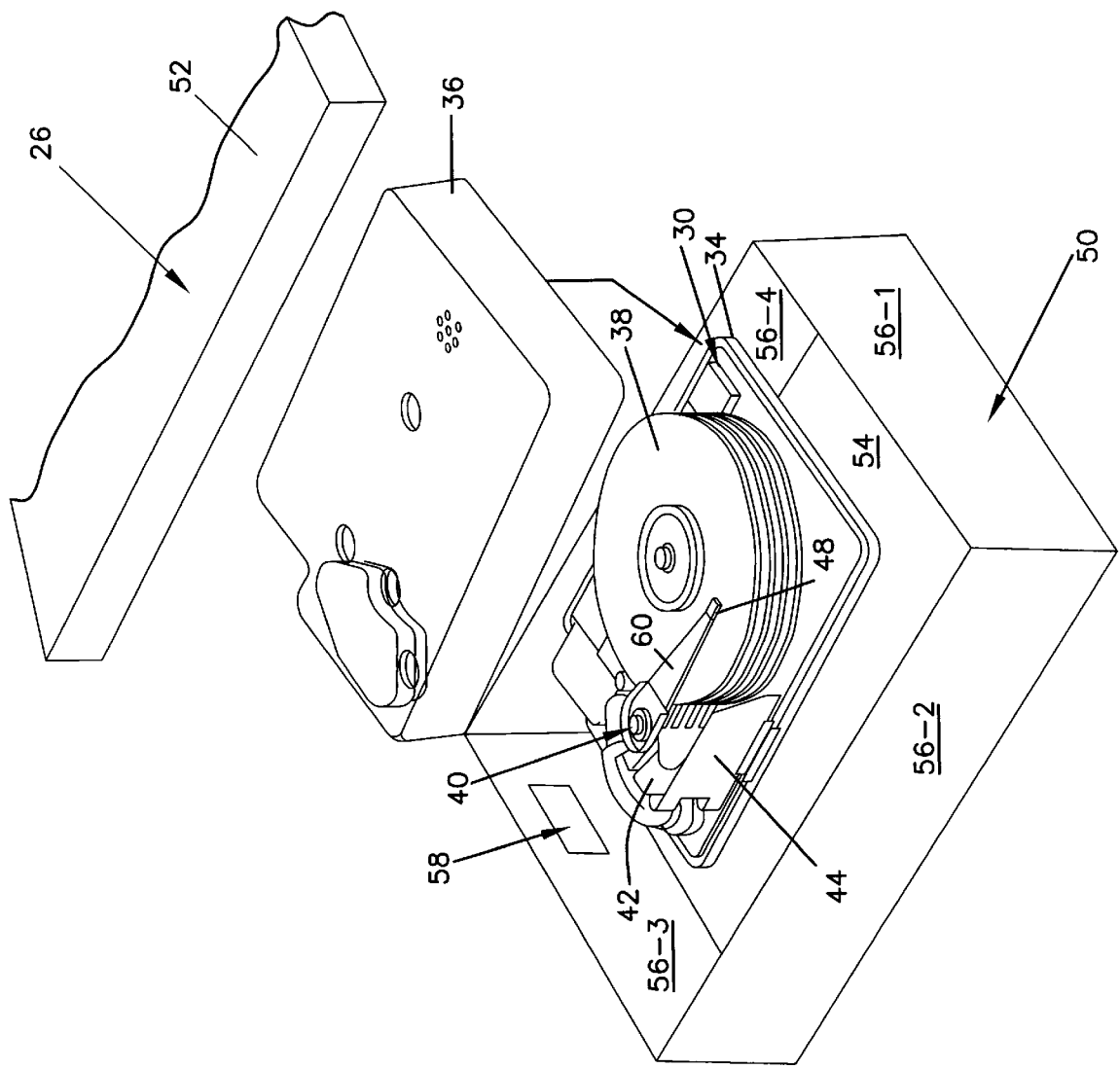
FIG. 2 is a perspective view of a disc drive enclosed within a carrier box.

FIG. 2 illustrates a disc drive 30 and carrier box 26 (partially shown). The disc drive 30 includes a base 34, cover 36, disc stack 38, actuator mechanism 40, voice coil motor 42, and flexible circuit 44. Discs of the disc stack 38 are rotationally coupled to base 34 via a spindle motor (not shown). Actuator mechanism 40 is rotationally coupled to base 34 to rotationally support a plurality of spaced disc heads 48 (only upper disc head is visible in FIG. 2) in alignment with disc surfaces of disc stack 38. The actuator mechanism 40 is moved for operation to align disc heads 48 relative to selected data tracks to read and write information to the disc surfaces via the voice coil motor 42. A flexible circuit 44 is coupled to disc heads 48, voice coil motor 42, and a spindle motor for selectively reading and writing information to discs. Cover 36 encloses the components of the disc drive.

The disc drive 30 is enclosed within carrier box 26 for insertion into individual compartments 24 of the mass storage array, as shown in FIG. 1. The carrier box 26 includes box 50 and cover 52. Box 50 is rectangular-shaped and includes base 54 and side walls 56 to form an inner cavity sized larger than disc drive 30. Disc drive 30 is inserted into inner cavity so that base 34 of disc drive 30 is supported by the base 54 of box 50. Various spacing devices are used to tightly secure disc drive 30 within box 50 to limit movement of the disc drive 30 therein. Such spacing devices may include springs, ribs, or foam inserts which are known in the art. Cover 52 closes box 50 containing disc drive 30. Operation circuitry of the disc drive 30 is coupled to a connector pin 58, illustrated diagrammatically on rear end wall 56-3 of carrier box 26 for selective connection to the host computer system 12.

Figure 3:
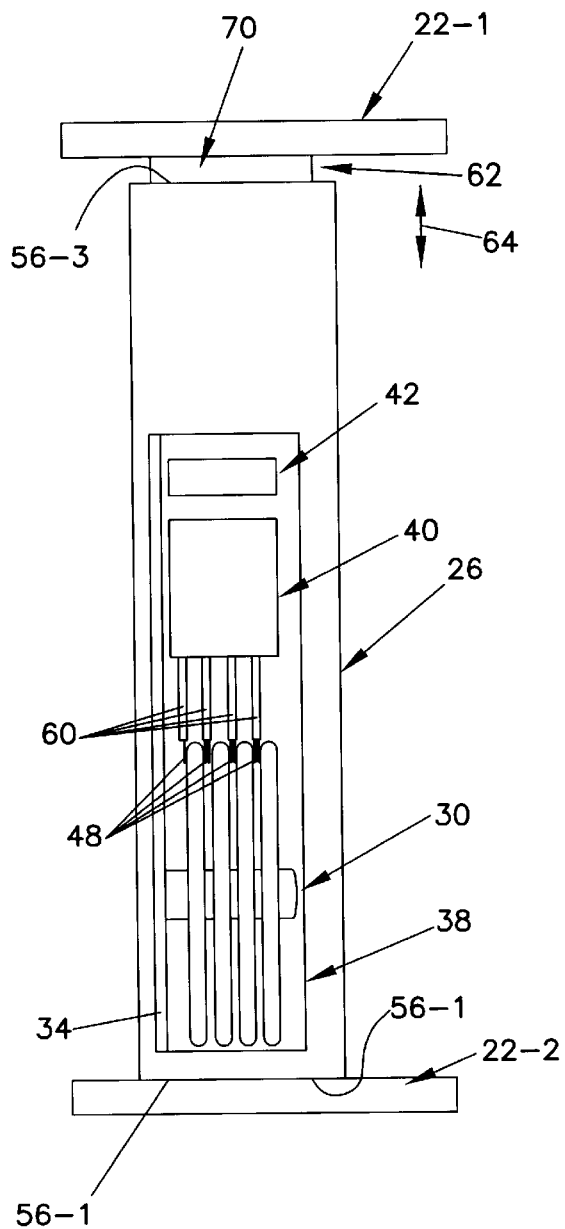
FIG. 3 is an illustrative view of a disc drive enclosed within a carrier box inserted in a compartment of a mass storage array.

Actuator mechanism 40 (shown diagrammatically in FIG. 3) rotates about an axis perpendicular to base 34 to define an operation stroke for the actuator mechanism 40, operated by the voice coil motor 42 (also shown diagrammatically in FIG. 3). The base 34 of disc drive 30 define longitudinal extents of the disc drive 30 corresponding to the operation stroke of the actuator mechanism 40. Vibration along the longitudinal extents of the disc drive 30 affects the operation stroke of the actuator mechanism 40. Although the invention is described with respect to a rotary-actuated device, alternate actuator devices, such as a linear actuator, may be used; and vibration in the direction of operation of the actuator mechanism similarly affects the operation stroke of the actuator mechanism.

Compartments 24, shown in FIG. 3, are aligned and sized to store carrier boxes 26 in an upright position. Thus, a longitudinal extent of disc drive 30, stored in compartment 24 shown in FIG. 3, extends in an upright direction. As illustrated in FIG. 3, opposed end walls 56-1 and 56-3 of carrier box 26 are supported between adjacent racks 22. When the disc drive 30 is in the upright position in compartment 24, the operation stroke moves relative to a longitudinal extent of the disc drive 30 between upper and lower positions between adjacent racks 22-1 and 22-2.

Typically, the dimension between adjacent racks 22-1 and 22-2 is slightly larger than the end-to-end dimension (between walls 56-1 and 56-3) of the carrier box 26 for insertion of carrier box 26 into a selected compartment. Thus, gap 62 is defined between an end of carrier box 26 and rack 22-1. Thus, during operation, carrier box 26 and, thus, disc drive 30, may vibrate along a longitudinal extent of the disc drive 30 between racks 22-1, 22-2 in gap 62, as illustrated by arrow 64.

As previously explained, the operation stroke of the actuator mechanism 40 is aligned so that actuator arms 60 of actuator mechanism 40, which support disc heads 48 relative to disc surfaces, move in an arc between upper and lower positions (not shown). Longitudinal vibration of the carrier box 26 in gap 62 is transferred to the disc drive 30 affecting the stroke of the actuator arm 60 of the actuator mechanism 40 between upper and lower positions. Thus, longitudinal vibration of the disc drive affects placement of disc heads 48, supported via actuator arms 60, relative to selected data tracks. Similarly, in alternately aligned disc drives 30, vibration may be imparted in the direction of the operational stroke of the actuator mechanism 40 which similarly affects placement of the disc heads 48 and the invention is not necessarily limited to a mass storage array where disc drives 30 are stored in an upright position.

Figure 4:
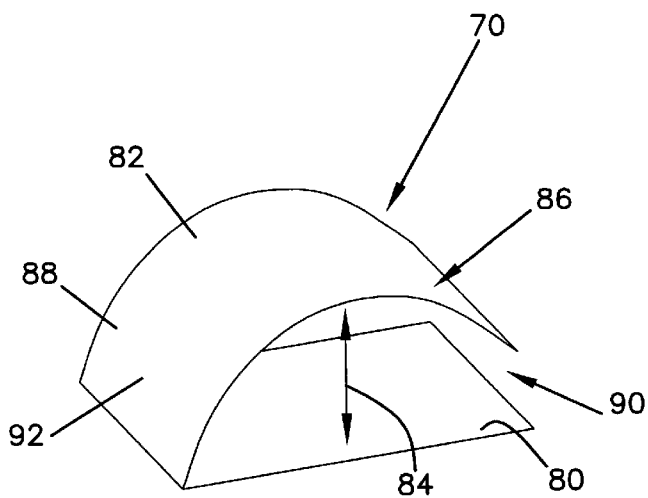
FIG. 4 is a perspective view of an embodiment of a vibration dampening device of the present invention.

In the mass storage array of the present invention, a vibration-dampening device 70 is included to reduce the longitudinal vibration of carrier box 26 between adjacent racks 22-2 and 22-2, as illustrated in FIG. 3. FIG. 4 is an illustrative view of the construction of one embodiment of a vibration-dampening device 70. As shown, the vibration-dampening device includes a clip 80 and spring 82. Clip 80 is designed to couple the device 70 relative to racks 22 to align spring 82 relative to gap 62. Preferably, the spring 82 is formed of a flexible dome-shaped member which is flexibly coupled to clip 80 to operate between a compressed position (not shown) and an extended position (shown). In the extended position, the spring 82 exerts a biasing force to the carrier box 26 and in the compressed position, the spring 82 compresses to allow for insertion of the carrier box 26.

In particular, the dome-shaped spring 82 flexes as illustrated by arrow 84 to move between the compressed position and the extended position. The dome shape of spring 82 defines a sloped insertion surface 86 and sloped release surface 88 for inserting and withdrawing carrier box 26. In particular, during insertion of carrier box 26 into compartment 24, the carrier box 26 contacts the slope insertion surface to compress the spring 82 for insertion of carrier box 26. Once inserted, the dome-shaped spring 82 exerts a biasing force to limit movement of the carrier box within the compartment 24. To release the carrier box 26, the carrier box 26 is moved to contact the slope release surface 88 to compress the spring 82 for release of the carrier box 26 from the compartment.

Preferably, the dome-shaped spring 82 and clip 80 are formed of a unitary member. The unitary member is bent to form the clip 80 and spring 82 which is flexibly coupled to clip 80 at the bent end. Thus, a spring clip device is formed having an opened end 90 and a closed end 92 (at bent end). Preferably, the unitary member is formed of a stainless steel material having a sufficient spring constant to provide a biasing force to the carrier box 26 to maintain the carrier box 26 in a fixed position relative to adjacent racks 22-1, 22-2. The spring constant of the spring is sufficiently flexible for compression of spring 82 during insertion and release of the carrier box 26 from the compartment.

Figure 5:
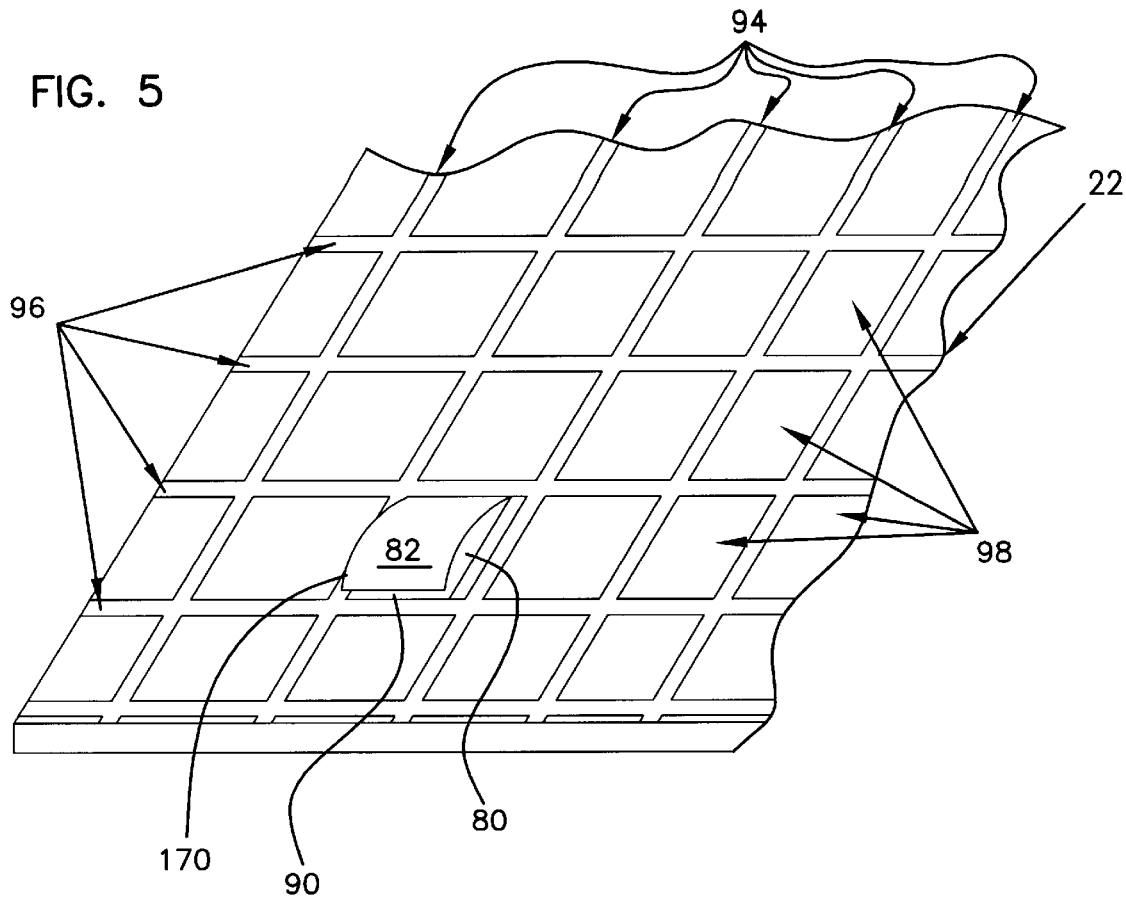
FIG. 5 is perspective view of an embodiment of a rack of a mass storage array including longitudinal and transverse ribs.

As shown in FIG. 5, racks 22 of the mass storage array preferably include longitudinal and transverse ribs 94 and 96, respectively, extending from exposed surfaces of the racks 22. The longitudinal and transverse ribs 94 and 96 form an array of recesses 98. Preferably, the clip 80 is formed of a planar member which is sized to detachably snap fit into recesses 98 to align spring 82 toward gap 62 in compartment 24. It should be understood that the dampening device 70 of the present invention is not limited to a planar clip sized to snap fit into recesses 98, and alternate methods for attaching a dampening device 70 to racks 22 may be used.

Rack 22, illustrated in FIG. 5, preferably includes ribs 94 and 96 on upper and lower surfaces. Preferably, clip 80 is secured relative to recesses 98 formed via ribs 94 and 96 on an upper rack 22-1 facing compartment 24. Preferably, a single device 70 is included and is positioned towards a forward portion of rack 22-1. In particular, in the preferred embodiment, the clip 80 is inserted into a second row recess 98. Preferably, the opened end 90 of a spring clip device faces forward, towards a forward opening of the compartment 24. Although a preferred arrangement of device has been described, it should be understood that the invention is not so limited and that devices 70 may be coupled to upper or lower racks 22-1, 22-2 and may be coupled to racks in a number of manners in a number of locations.

In a preferred embodiment of a spring clip device, the clip 80 is rectangular shaped, having a length of approximately 1.0 inches (25.4 millimeters) and a width of approximately 0.24 inches (6.1 mm). Height of a dome-shaped spring 82 coupled to clip 80 is approximately 0.24 inches (6.1 mm). The length of dome-shaped spring 82 is approximately 0.9 inches (22.86 mm) and the width is approximately 0.24 inches (6.1 mm). Although a dome-shaped spring 82 has been disclosed, it should be understood that the invention is not limited to a dome-shaped spring and that alternate embodiments of a spring which provide a biasing force to the carrier box 26 to limit vibration of the disc drive may be used.

Thus, as described, the device of the present invention eliminates vibration, which reduces errors in reading and writing information to data tracks of a disc drive 30. In particular, the present invention eliminates vibration along an extent of the disc drive aligned with the operational stroke of the disc drive to reduce the effect of vibration on the actuator arms 60 which skews the operational stroke of the disc heads 48.

Figure 6:
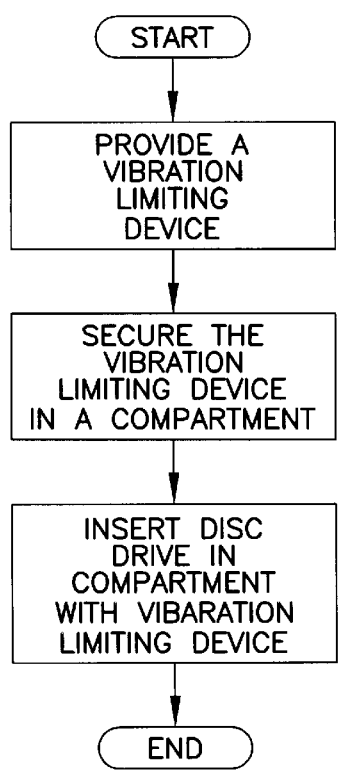
FIG. 6 is a flow chart illustrating a method for limiting longitudinal vibration to a disc drive in a mass storage array according to the present invention.

FIG. 6 is a flow chart illustrating the steps for limiting longitudinal vibration to a disc drive in a mass storage array according to the present invention. As shown, the process starts at block 100 by providing a vibration-limiting device, as illustrated by block 102. The vibration-limiting device is inserted into a storage compartment 24, as illustrated by block 106 and thereafter a disc drive 30 may be stored in the compartment 24, as illustrated by block 106, to complete the process, as illustrated by block 108.

The present invention includes a vibration control device 70 which is designed to limit longitudinal vibration. Preferably, the device 70 includes a spring 82 which is adapted to exert a biasing force to a disc drive 30 inserted into a compartment 24 and a clip 80 coupled to the spring 82 for securing the spring 82 relative to spaced racks 22. In particular, in the preferred embodiment, the clip 80 is designed to snap fit into recesses 98 formed in the racks 22 to support the spring 82 for contact with a carrier box 26 enclosing the disc drive 30 to limit longitudinal movement of the carrier box 26 within a gap 62 defined between adjacent racks 22 and the carrier box 26.

It is to be understood that even though numerous characteristics and advantages of various embodiments of the present invention have been set forth in the foregoing description, together with details of the structure and function of the various embodiments of the invention, this disclosure is illustrative only, and changes may be made in detail, especially in matters of structure and arrangement of parts within the principles of the present invention to the full extent indicated by the broad generally meaning of the terms in which the appended claims are expressed. For example, the particular elements may vary depending upon the particular structure of the mass storage array without departing from the scope and spirit of the present invention.

What is claimed is:

1. A mass storage array for releasably supporting a plurality of disc drives comprising:
   a base supporting a plurality of racks of transverse spaced racks, the extent between adjacent racks defining a plurality of compartments therealong for removably storing a disc drive including moveable operating components for retrieving data from a data storage disc; and
   a vibration control device adapted to be coupled to a rack to exert a biasing force to a disc drive inserted into a compartment of a mass storage array to limit vibration. compartment of a mass storage array.

2. The mass storage array of claim 1 wherein a disc drive is supported in a compartment in upright alignment such that a stroke of an actuator mechanism supporting disc heads operates between upper and lower positions and the vibration control device is aligned to exert a biasing force to limit the movement of the disc drive within the compartment along the axis between the upper and lower position.

3. The mass storage array of claim 1 wherein the vibration control device includes a biasing spring to exert a biasing force to a disc drive inserted into a compartment.

4. The mass storage array of claim 3 wherein the vibration control device includes a clip member coupled to the spring for securing the vibration control device within a compartment of the mass storage array.

5. The mass storage array of claim 4 wherein the clip member is a planar member.

6. The mass storage array of claim 4 wherein the clip member and spring are formed of a unitary member.

7. The mass storage array of claim 6 wherein the unitary member is an elongated sheet of uniform thickness which is bent to define a planar clip member and spring, the bent sheet defining an opened end and closed end between the planar clip member and spring.

8. The mass storage array of claim 7 wherein the racks include longitudinal and transverse ribs defining recesses, and the clip member is adapted to snap fit into the recesses of a rack.

9. The mass storage array of claim 8 wherein the clip member is secured to a position selected from a group consisting of:
   an upper rack of a compartment and a forward portion of the rack of a compartment.

10. The mass storage array of claim 3 wherein the spring is dome-shaped.

11. In combination:
    a disc drive including a base and at least one disc rotationally coupled to the base and an actuator mechanism movably coupled to the base, the actuator mechanism supporting heads to read or write data from a disc;
    a base supporting a plurality of transverse spaced racks, the extent between adjacent racks defining compartments for removably storing a disc drive; and
    a vibration control device adapted to be coupled to a rack to exert a biasing force to a disc drive inserted into a compartment of a mass storage array to limit vibration for desired head placement.

12. The combination of claim 11 wherein the vibration control device includes a biasing spring.

13. The combination of claim 12 wherein the vibration control device includes a clip member coupled to the spring for securing the vibration control device within a compartment of the mass storage array.

14. The combination of claim 13 wherein the clip member is a planar member.

15. The combination of claim 13 wherein the clip member and spring are formed of a unitary member.

16. The combination of claim 15 wherein the unitary member is an elongated sheet of uniform thickness which is bent to define a planar clip member and spring, the bent sheet defining an opened end and closed end between the planar clip member and spring.

17. The combination of claim 13 wherein the racks include longitudinal and transverse ribs defining recesses, and the clip member is adapted to snap fit into the recesses of a rack.

18. The combination of claim 13 wherein the clip member is secured to a position selected from a group consisting of:
    an upper rack of a compartment and a forward portion of the rack of a compartment.

19. The combination of claim 12 wherein the spring is dome-shaped.

20. The combination of claim 11 and further comprising:

a carrier box enclosing the disc drive, the carrier box being sized for insertion into a compartment of a mass storage array, said vibration control device being coupled to the carrier box to limit vibration of a disc drive.

* * * * *

UNITED STATES PATENT AND TRADEMARK OFFICE
CERTIFICATE OF CORRECTION

PATENT NO.   :   5,917,676
DATED        :   June 29, 1999
INVENTOR(S)  :   Theodore Browning It is certified that error appears in the above-identified patent and that said Letters Patent is hereby corrected as shown below:

Column 1, line 7; "abn" should be "and"

Claim 1, Column 5, line 65; "compartment of a mass storage array." second occurrance; should be deleted.

Signed and Sealed this

Twenty-second Day of May, 2001

*Attest:*

NICHOLAS P. GODICI

*Attesting Officer*       Acting Director of the United States Patent and Trademark Office